(No Model.)
C. C. HAYES.
ROAD CART.
No. 391,246. Patented Oct. 16, 1888.
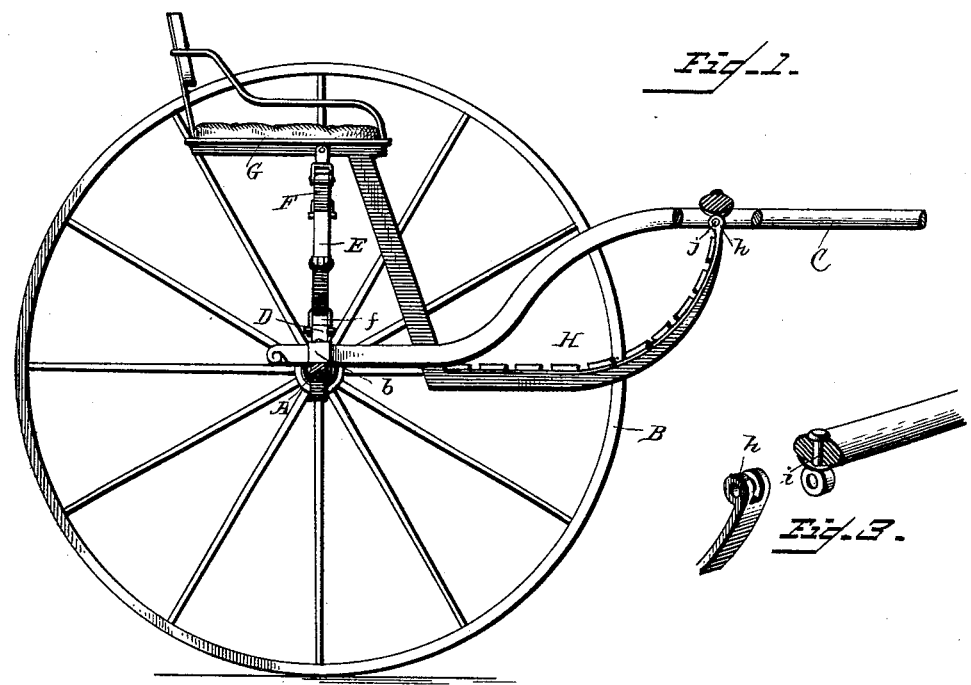
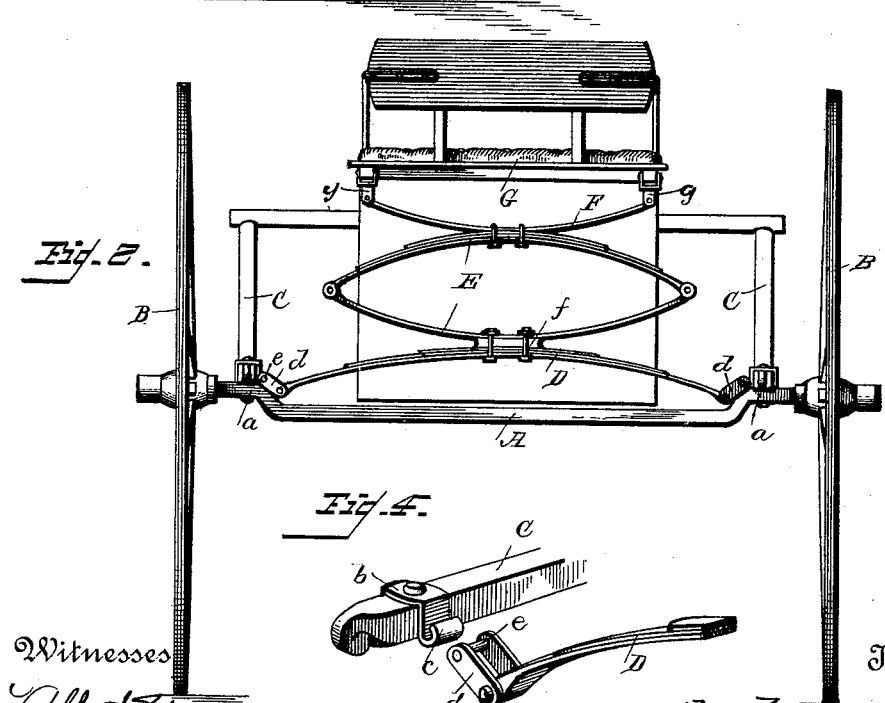
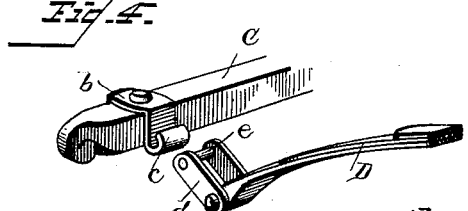
Witnesses
Albert Speiden
E. G. Bennett
Inventor,
Charles C. Hayes.
By his Attorney
Chas. H. Fowler

United States Patent Office.

CHARLES C. HAYES, OF PENN YAN, NEW YORK.

ROAD-CART.

SPECIFICATION forming part of Letters Patent No. 391,246, dated October 16, 1888.

Application filed June 21, 1888. Serial No. 277,818. (No model.)

*To all whom it may concern:*

Be it known that I, CHARLES C. HAYES, a citizen of the United States, residing at Penn Yan, in the county of Yates and State of New York, have invented certain new and useful Improvements in Road-Carts; and I do hereby declare that the following is a full, clear, and exact description of the same, reference being had to the annexed drawings, making a part of this specification, and to the letters and figures of reference marked thereon.

This invention relates to certain new and useful improvements in road-carts, and has for its object to improve upon previous constructions of this character and to render the vehicle easy-riding, doing away with the so-called "horse motion" and dividing the strain equally among the several parts, thus lessening the liability to damage in riding over rough roads. The novelty resides in the peculiar combinations and the construction, arrangement, and adaptation of parts, all as more fully hereinafter described, shown in the drawings, and then particularly defined by the claim.

The invention is clearly illustrated in the accompanying drawings, which, with the letters of reference marked thereon, form a part of this specification, and in which—

Figure 1 is a side view of a vehicle constructed in accordance with my invention. Fig. 2 is a rear end view of the same. Figs. 3 and 4 are details.

Referring now to the details of the drawings by letter, A designates the axle, which is provided at each end, just inside of the hubs of the wheels B, with a downward offset, $a$, as shown best in Fig. 2.

The shafts C are bolted to the axle in any well-known manner. The rear ends of the shafts are provided with a metallic clip, $b$, bolted thereto and formed with an upwardly-turned end, $c$, as seen best in Fig. 4.

D is a semi-elliptic spring, to the ends of which are pivoted the shackles or links $d$, the ends of which are connected by the bar $e$, which engages the upwardly-turned end of the clips $b$.

Secured to the spring D is the elliptic spring E, a rubber or equivalent block $f$, preferably being placed between the said springs, as shown in Fig. 2.

To the spring E is secured in any suitable manner the semi-elliptic spring F, to the ends of which are pivoted the loop-eyes $g$, which carry at their upper ends the seat-supports, the seat G being supported just forward of its center by means of the sets of springs above described, as shown in Figs. 1 and 2.

The foot board or support H is supported from the seat at its rear end, and at its forward end is formed with an eye, $h$, between the ears of which is a slot, said ears being provided with holes, as shown, and the cross-bar of the shafts being provided with a bolt, $i$, depending therefrom and formed with an eye, as shown in Fig. 4, a bolt, $j$, being passed through the holes in the ears and through the eye of the bolt $i$ to secure them together.

In practice it has been found that with a vehicle constructed as above described the rider is not affected by the jars and jolts usually occasioned by riding over rough ground, and the parts are so arranged and connected that the strain is equally divided, and thus a very durable vehicle is provided.

Having thus described my invention, what I claim as new is—

In a road-cart, the combination, with the axle and the shafts secured at their rear ends to said axle and formed with a depressed portion between the ends, of the semi-elliptic spring pivotally secured at its ends to the rear ends of said shafts, the elliptic spring secured to the semi-elliptic spring, the semi-elliptic spring secured on top of the elliptic spring, the seat secured to the uppermost of said springs, and the foot-support secured at one end to said seat and at its other end pivotally connected with the cross-bar of the shafts, substantially as and for the purpose specified.

In testimony that I claim the above I have hereunto subscribed my name in the presence of two witnesses.

CHARLES C. HAYES.

Witnesses:
 ALFRED CROSBY,
 BYRON EATON.